US 8,624,929 B2

(12) United States Patent
Peng

(10) Patent No.: US 8,624,929 B2
(45) Date of Patent: Jan. 7, 2014

(54) SYSTEM FOR TRANSFORMING AND DISPLAYING COORDINATE DATUM

(76) Inventor: Hsin-Fung Peng, Sanyi Township, Miaoli County (TW)

( * ) Notice: Subject to any disclaimer, the term of this patent is extended or adjusted under 35 U.S.C. 154(b) by 389 days.

(21) Appl. No.: 13/017,050

(22) Filed: Jan. 30, 2011

(65) Prior Publication Data

US 2012/0194557 A1 Aug. 2, 2012

(51) Int. Cl.
*G09G 5/00* (2006.01)
(52) U.S. Cl.
USPC .......................................... 345/663; 345/643
(58) Field of Classification Search
None
See application file for complete search history.

(56) References Cited

U.S. PATENT DOCUMENTS 6,759,979 B2 * 7/2004 Vashisth et al. ........... 342/357.31
2004/0076344 A1 * 4/2004 Albertelli et al. ............. 382/305

* cited by examiner

*Primary Examiner* — Kee M Tung
*Assistant Examiner* — Leon T Cain, II

(57) ABSTRACT

A system for transforming and displaying coordinates dates, which collects a coordinate area image from a controller of a machine by image collect means, wherein the coordinate imager includes numeral pattern and the coordinate numeral of the numeral pattern is gained from the feedback value of the grating scale or the encoder of the machine, and displayed on a monitor of the controller. The system, hereinbefore, transforms the coordinate numeral pattern into coordinate value for calculating and the change range of the coordinate value is synchronously displayed on a screen of the system for a measure system to refer and compare.

4 Claims, 8 Drawing Sheets

SYSTEM FOR TRANSFORMING AND DISPLAYING COORDINATE DATUM

BACKGROUND OF THE INVENTION

1. Field of the Invention

The present invention relates to a system for transforming and displaying coordinate datum, and more particularly to a system that transforms coordinate image into digital coordinate signals and displays these digital coordinate signals.

2. Description of Related Art

Early days, a contact-type measure method is the main means for measuring an object. For achieving the purpose of a precise measure, different assist tools and gauges are necessary. However, to design and manufacture these tools and gauges takes a lot of time and spends a lot of money. In addition, the previous processes for positioning and checking these tools and gauges. As a result, the cost of the conventional measure method is expensive.

For solving this problem, non-contact type measure methods are provided and continually developed. The known non-contact measure methods include laser, ultrasonic wave, optical and image measure that are provided for high precise process service.

A precise measure is very important to a precise process. Consequently, an optical lens is provided for promoting measure result. However, the collect scope is limited such that a linear scale or an encoder is helpful to the optical lens. In addition, the standards, modes and signals are different to one another due to the manufacturers of linear scales and encoders. It is very expensive to provide a measure system for various linear scales and encoders and the expensive measure system shall not be widely used.

The present invention has arisen to mitigate and/or obviate the disadvantages of the conventional precise measure system.

SUMMARY OF THE INVENTION

The main objective of the present invention is to provide an improved system that transforms coordinate image into digital coordinate signals and displays these digital coordinate signals.

To achieve the objective, the system for transforming and displaying coordinates dates, which collects a coordinate area image from a controller of a machine by image collect means, wherein the coordinate imager includes numeral pattern and the coordinate numeral of the numeral pattern is gained from the feedback value of the grating scale or the encoder of the machine, and displayed on a monitor of the controller. The system, hereinbefore, transforms the coordinate numeral pattern into coordinate value for calculating and the change range of the coordinate value is synchronously displayed on a screen of the system for a measure system to refer and compare.

The system is embedded in a machine tool and comprises an image collect module processing a step of collecting a coordinate area image from a controller of a machine tool. The coordinate area image includes coordinate numeral patterns of X-axis, Y-axis and Z-axis. A discern and transform module is electrically coupled to the image collect module. The discern and transform module receives the coordinate area image from the image collect module and transforms the coordinate numeral patterns into digital coordinate values for system to compute, wherein the coordinate values are timely shown on a result display region of an operational interface that is electrically coupled to the image collect module.

The system in accordance with the present invention collects a coordinate area image including X-axis coordinate, Y-axis coordinate and Z-axis coordinate from a controller of the machine tool by image collect means. The coordinate numeral patterns in the coordinate area image are transformed into coordinate values that can be computed by the system of the present invention and timely shown on the displayer by the skill of discerning and transforming. As a result, the system in accordance with the present invention executes the processes of discerning, transforming and showing at the same time for synchronously and effectively transforming coordinate datum. In addition, the transformed coordinate datum can be directly computing. The system in accordance with the present invention does not concern the collect skill of electric signal and optical signal of grating scale and encoder such that the system can be provided to any machine tool. As a result, the use scope of system in accordance with the present invention is widened.

Further benefits and advantages of the present invention will become apparent after a careful reading of the detailed description with appropriate reference to the accompanying drawings.

DETAILED DESCRIPTION OF THE INVENTION

Figure 1:
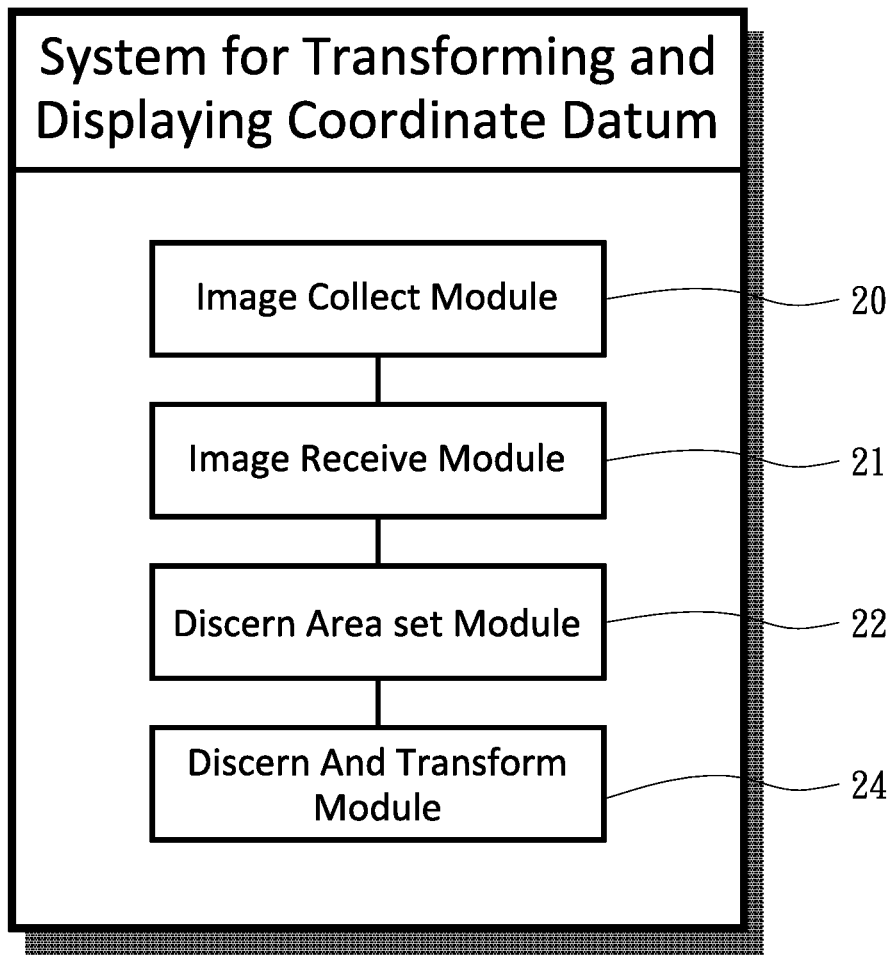
FIG. 1 is a block diagram of a system for transforming and displaying coordinate datum in accordance with the present invention.

Referring to the drawings and initially to FIG. 1, a system for transforming and displaying coordinate datum in accordance with the present invention comprises an image collect module (20), an image receive module (21) electrically coupled to the image collect module (20), a discern area set module (22) electrically coupled to the image receive module (21), and a discern and transform module (24) electrically coupled to the discern area set module (22).

Figure 2:
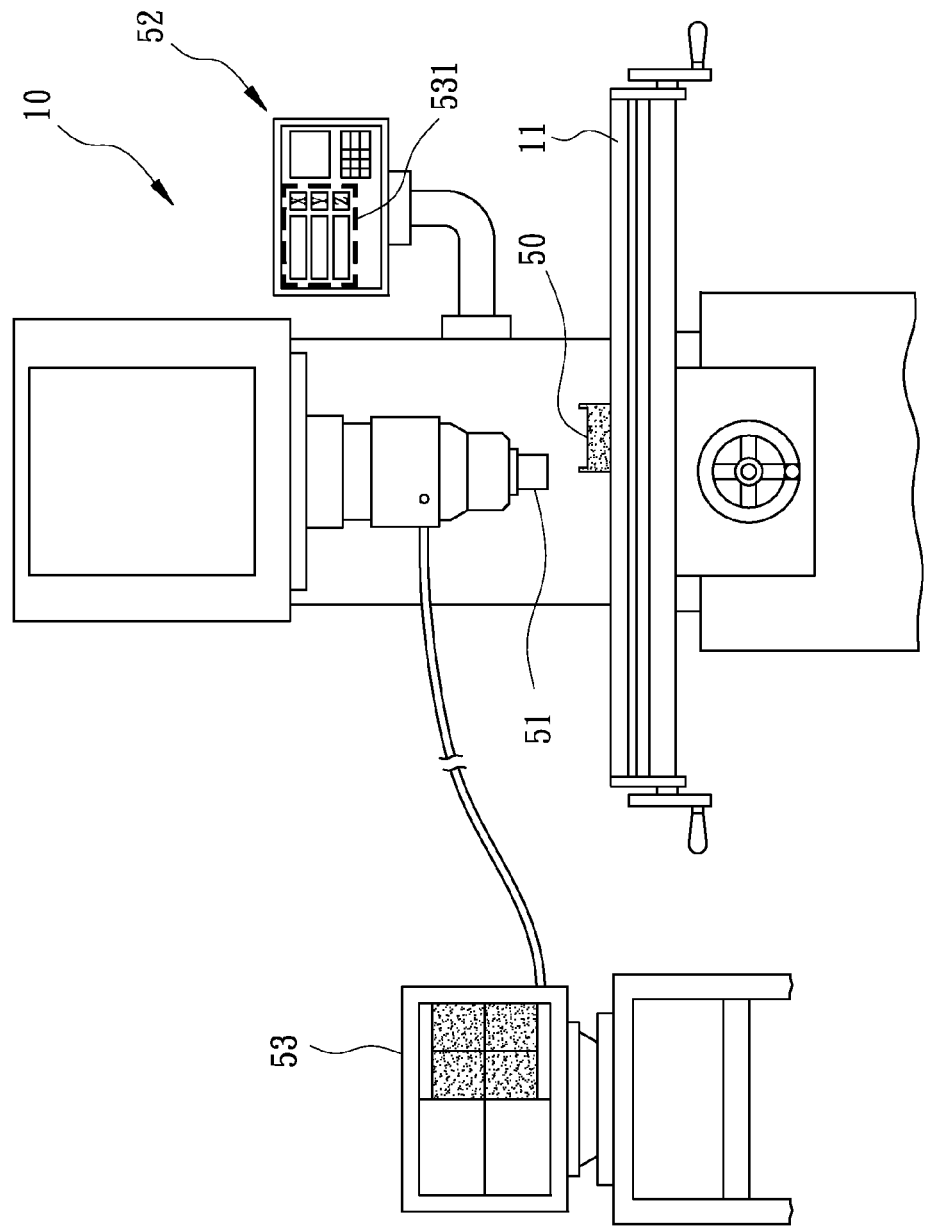
FIG. 2 is a plan schematic view of the system in accordance with the present invention.
Figure 3:
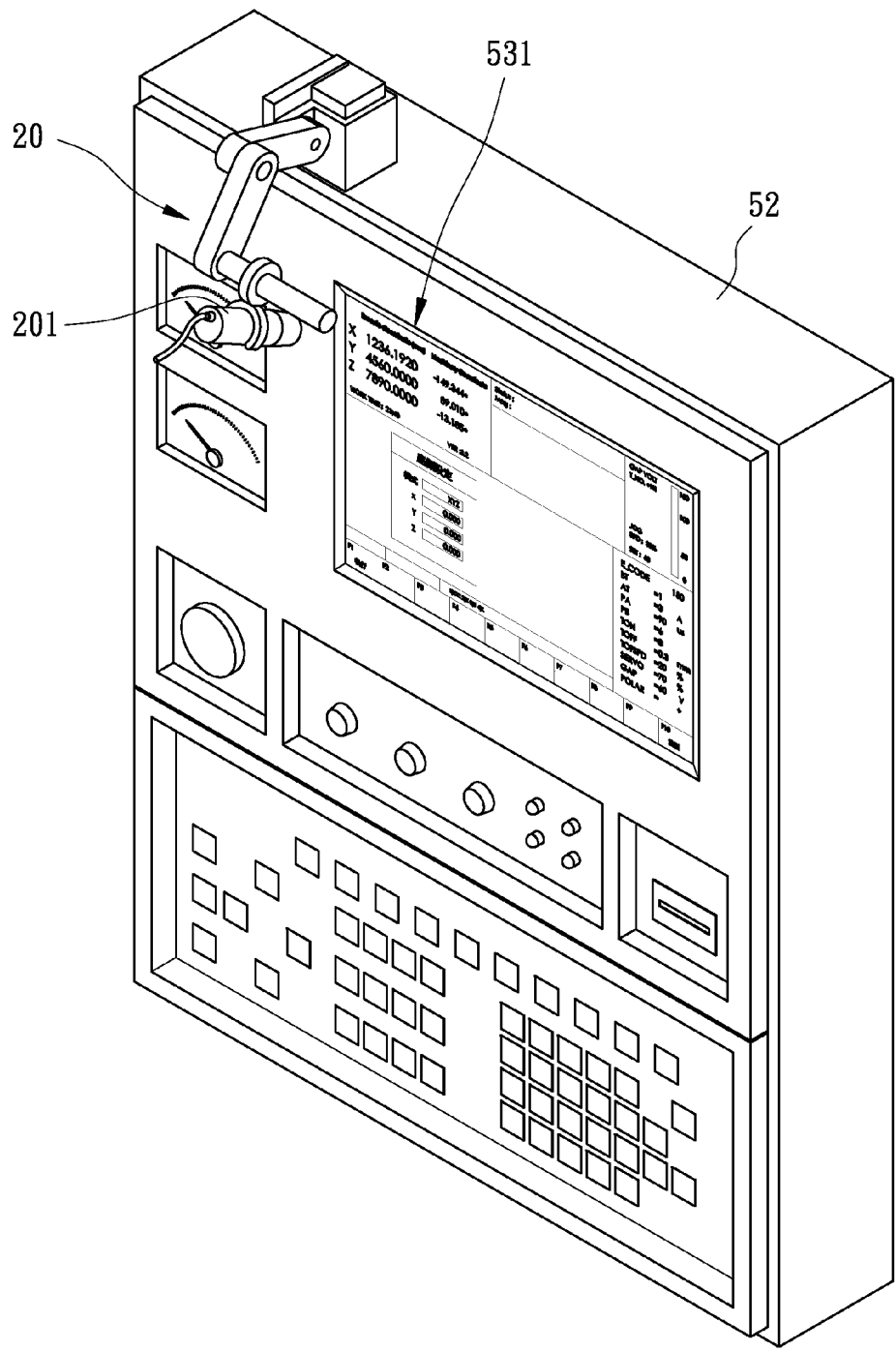
FIG. 3 is a perspective schematic view of the system in accordance with the present invention.
Figure 4:
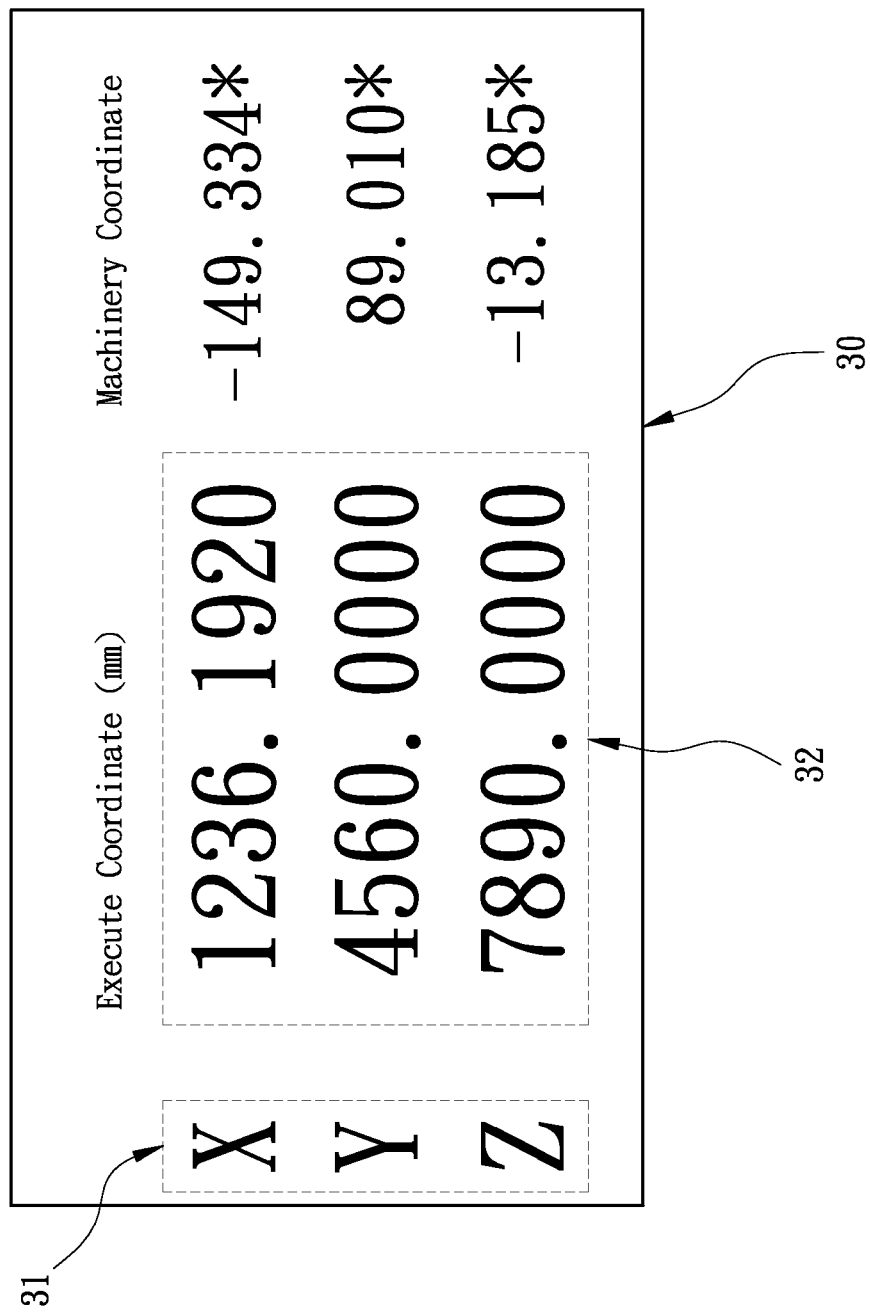
FIG. 4 is a front plan view of a coordinate area image of the system in accordance with the present invention.

Further with reference to FIG. 2, the image collect module (20) collects a coordinate area image (30), including X-axis coordinate, Y-axis coordinate and Z-axis coordinate, from a controller (52) of a machine tool (10), as shown in FIG. 3. The coordinate area image (30) includes coordinate numeral patterns (31) that are provided from grating scales on the machine tool and shown on the controller (52).

Figure 5:
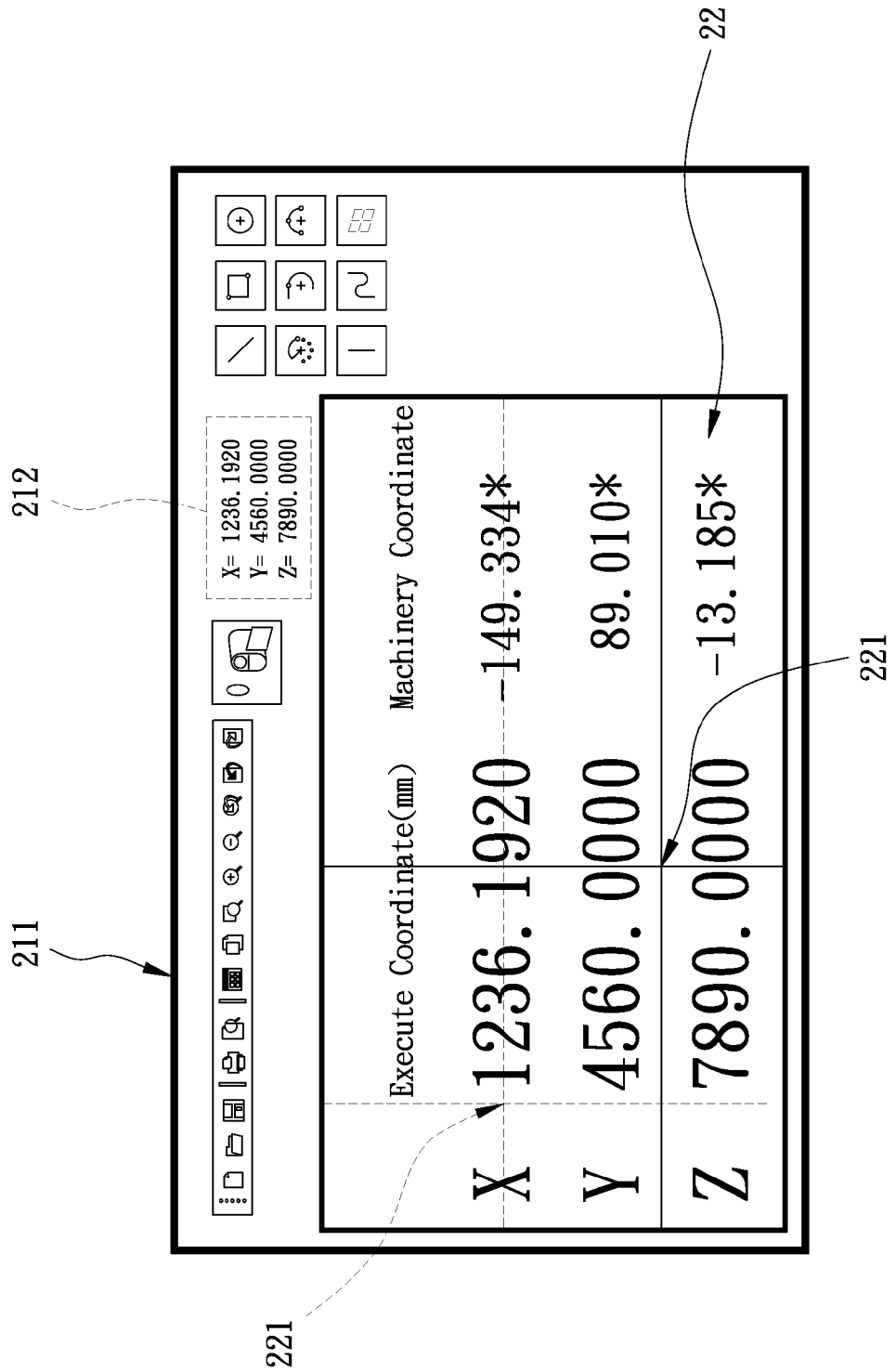
FIG. 5 is a front plan view of an operational interface of the system in accordance with the present invention.

The image receive module (21) includes an operational interface (211) disposed therein. The image receive module (21) receives the coordinate area image (30) and shows the coordinate area image (30) on the operational interface (211), as shown in FIG. 5.

The discern area set module (22) provides an operational tool, such as a mouse, for user to mark a specific area in the coordinate area image (30), which the user purpose to execute.

The discern and transform module (24) receives the datum in the marked specific area and transforms the coordinate numeral patterns (31) into digital coordinate numerals for system to compute, wherein the digital coordinate numerals are synchronously shown on a result display region (212) that is disposed in the operational interface (211). The ciphers, including 0 through 9, are previously installed and respectively correspond to pattern samples of the X-axis, the Y-axis and the Z-axis.

Hereinafter, a preferred embodiment in accordance with the present invention is provided for illustrative purpose. With reference to FIG. 2, a machine tool (10) includes a grating scale or an encoder disposed thereon for measuring the movements respectively on the X-axis, the Y-axis and the Z-axis. A workpiece (50) is secured on a horizontal platform (11) of the machine tool (10). A camera (51) is mounted on the machine tool (10) for collecting an image of the workpiece (50), wherein the image of the workpiece (50) is sent to a displayer (53) that is electrically coupled with the controller (52) of the machine tool (10). Consequently, the machine tool (10) can execute a measure process to the workpiece (50) via the controller (52) and the displayer (53). A coordinate display area (513) is disposed on the controller (52) for showing the coordinate values of the X-axis, the Y-axis and the Z-axis.

Accordingly, with reference to FIGS. 3 through 8, the system in accordance with the present invention executes the following processes.

Collecting and transforming the coordinate area image: the image collect module (20) collects an image from the coordinate display area (531) of the displayer (53) via a lens (201) that is disposed thereon, and forms an coordinate area image (30) including X-axis coordinate, Y-axis coordinate and Z-axis coordinate. The coordinate area image (30) including character patterns (31) including the X(axis), the Y(axis) and Z(axis), and coordinate numeral patterns (32). The coordinate area image (30) is transmitted to the image receive module (21). The image receive module (21) shows the coordinate area image (30) on the operational interface (211), as shown in FIG. 5.

Figure 6:
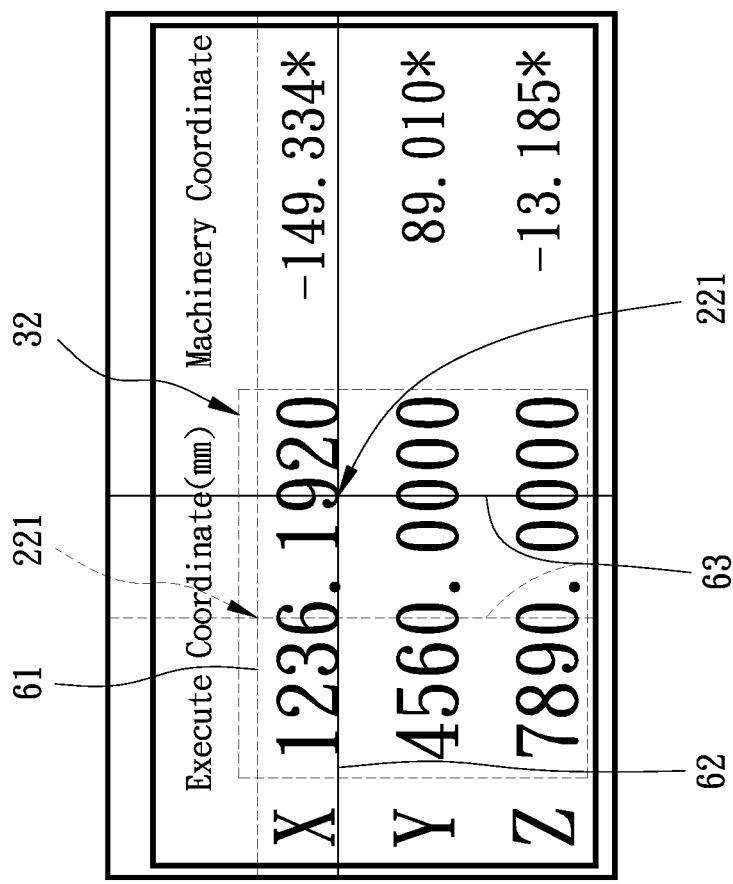
FIG. 6 is another front plan view of the operational interface for showing the step of set a discern area.
Figure 7:
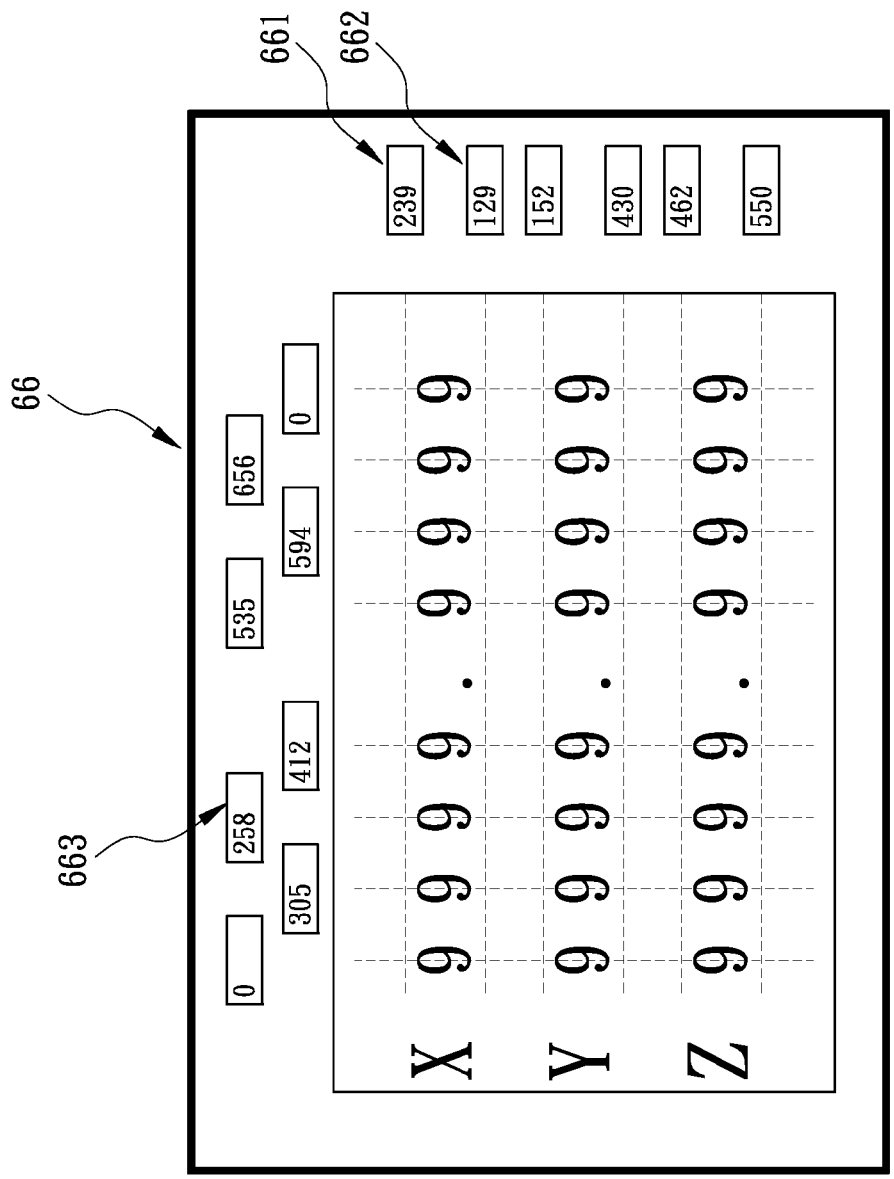
FIG. 7 is a front plan view of a coordinate input interface of the system in accordance with the present invention.
Figure 8:
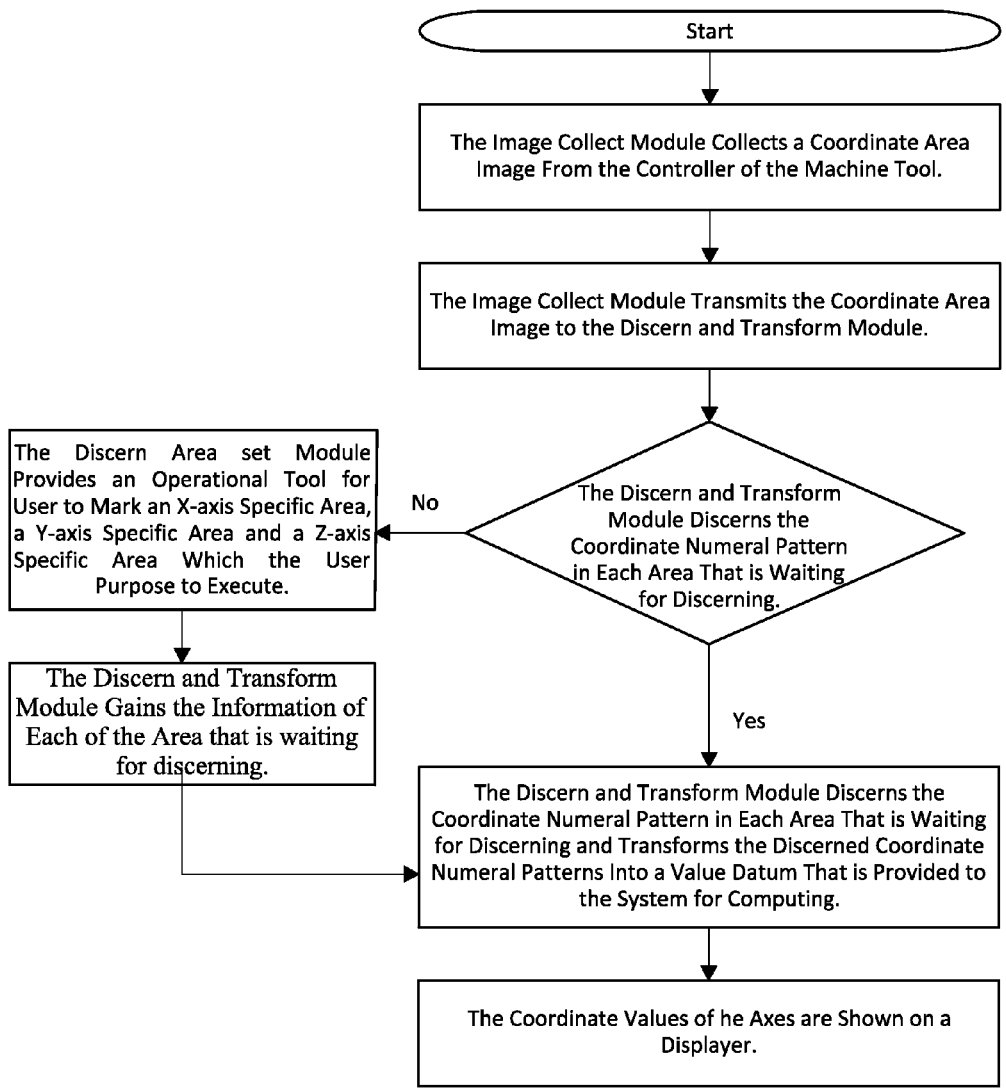
FIG. 8 is a flow chart of the system for transforming and displaying coordinate datum in accordance with the present invention.

Marking discern area: the discern area set module (22) provides an operational tool for user to mark an X-axis specific area, a Y-axis specific area and a Z-axis specific area which the user purpose to execute. In the preferred embodiment of the present invention, the operational tool is a phillips vernier (221) for user to sequentially mark the coordinate numeral patterns (32) of the X-axis, the Y-axis and the Z-axis and form multiple specific areas on the coordinate area image (30). Marking method: as shown in FIG. 6, the user can user the vernier (211) to click an upper limit point and a lower limit point of each of the coordinate numeral patterns (32). Continually, the user uses the vernier (211) to click a middle point of each of the coordinate numeral patterns (32) of one of the three axes to form a crossed discern area. The discern area set module (22) timely provides two-dimensional coordinates when the vernier (221) is moved. Accordingly, the user can gain an upper limit coordinate (61), a lower limit coordinate (62) and a central coordinate (63) that form a area waiting for discerning With reference to FIG. 7, a coordinate input interface (66) is electrically coupled with the discern and transform module (24) such that the user can respectively input the upper limit coordinate (61), the lower limit coordinate (62) and the central coordinate (63) into a corresponding input box via the coordinate input interface (66). As a result, the discern and transform module (24) can gain the information of each of the area that is waiting for discerning. As shown in FIG. 7, in the coordinate input interface (66), each axis has an upper limit coordinate input box (661), a lower limit coordinate input box (662) and a central coordinate input box (663) for user to respectively input the upper limit coordinate (61), the lower limit coordinate (62) and the central coordinate (63) of each of the coordinate numeral patterns (32).

Discerning and transforming: the discern and transform module (24) discerns the coordinate numeral pattern (32) in each area that is waiting for discerning and transforms the discerned coordinate numeral patterns (32) into a value datum that is provided to the system for computing. Accordingly, the computed value datum are shown on a result display region (212) of the operational interface (211) by ciphers, as shown in FIG. 5.

The process of marking discern area is executed when embedding the system of the present invention in the machine tool (10). Consequently, the process of discerning and transforming is timely executed after the image collect module (20) collects a coordinate area image (30) such that the coordinate numeral patterns (32) of the X-axis, the Y-axis and the Z-axis are transformed into coordinate values that can be computed by the system of the present invention and shown on the displayer (53) for a measure system to set a calculating parameter.

As described above, the system in accordance with the present invention collects a coordinate area image (30) including X-axis coordinate, Y-axis coordinate and Z-axis coordinate from a controller (53) of the machine tool (10) by image collect means. The coordinate numeral patterns (32) in the coordinate area image (30) are transformed into coordinate values that can be computed by the system of the present invention and timely shown on the displayer (53) by the skill of discerning and transforming. As a result, the system in accordance with the present invention executes the processes of discerning, transforming and showing at the same time for synchronously and effectively transforming coordinate datum. In addition, the transformed coordinate datum can be directly computing. The system in accordance with the present invention does not concern the collect skill of electric signal and optical signal of grating scale and encoder such that the system can be provided to any machine tool. As a result, the use scope of system in accordance with the present invention is widened.

Although the invention has been explained in relation to its preferred embodiment, it is to be understood that many other possible modifications and variations can be made without departing from the spirit and scope of the invention as hereinafter claimed.

What is claimed is:

1. A system for transforming and displaying coordinate datum, the system embedded in a machine tool and comprising:

an image collect module processing a step of collecting a coordinate area image from a controller of a machine tool, the coordinate area image including coordinate numeral patterns of X-axis, Y-axis and Z-axis;

a discern and transform module electrically coupled to the image collect module, the discern and transform module receiving the coordinate area image from the image collect module and transforming the coordinate numeral patterns into digital coordinate values for the system to compute, wherein the coordinate values are timely shown on a result display region of an operational interface that is electrically coupled to the image collect module;

an image receive module electrically coupled to the image collect module, the image receive module receiving the coordinate area image from the image collect module and showing the coordinate area image on the operational interface; and a discern area set module electrically coupled to the image receive module, the discern area set module including a phillips vernier for a user to sequentially mark the coordinate numeral patterns of the X-axis, the Y-axis and the Z-axis and form multiple specific areas on the coordinate area image, which the user purposes to execute, wherein the marked specific areas are transmitted to the discern and transform module.

2. The system for transforming and displaying coordinate datum as claimed in claim 1, wherein the image collect module includes a lens disposed thereon, the lens collecting an image from a coordinate display area of a displayer that in mounted on the machine tool.

3. The system for transforming and displaying coordinate datum as claimed in claim 1, wherein each specific area includes an upper limit coordinate, a lower limit coordinate and a central coordinate, the upper limit coordinate being gained when the phillips vernier passing through an upper limit point of each of the coordinate numeral patterns, the lower limit coordinate being gained when the phillips vernier passing through a lower limit point of each of the coordinate numeral patterns, the central limit coordinate being gained when the user click a middle point of each of the coordinate numeral patterns.

4. The system for transforming and displaying coordinate datum as claimed in claim 1, wherein a coordinate input interface is electrically coupled to the discern and transform module such that the user can input the upper limit coordinate, the lower limit coordinate and the central coordinate into the discern and transform module via the coordinate input interface.

* * * * *